(12) United States Patent
Hayashi

(10) Patent No.: US 7,283,284 B2
(45) Date of Patent: Oct. 16, 2007

(54) IMAGE READING APPARATUS

(75) Inventor: Toshio Hayashi, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 968 days.

(21) Appl. No.: 10/410,348

(22) Filed: Apr. 10, 2003

(65) Prior Publication Data

US 2003/0193698 A1    Oct. 16, 2003

(30) Foreign Application Priority Data

Apr. 16, 2002   (JP)   .............................. 2002-113440

(51) Int. Cl.
*H04N 1/04* (2006.01)
(52) U.S. Cl. ...................................... 358/474; 358/453
(58) Field of Classification Search ................ 359/197; 250/234; 380/243–246; 358/213.11, 474, 358/500, 505, 513, 514, 453, 496, 497, 498, 358/483, 439
See application file for complete search history.

(56) References Cited

U.S. PATENT DOCUMENTS

| 5,689,347 | A | 11/1997 | Naoi |
| 5,751,438 | A * | 5/1998 | Murai et al. ................. 358/474 |
| 6,031,638 | A * | 2/2000 | Rao et al. ................... 358/474 |
| 6,122,077 | A | 9/2000 | Kaji |
| 2002/0041407 | A1 * | 4/2002 | Takahashi et al. .......... 358/529 |

FOREIGN PATENT DOCUMENTS

| JP | 3-107276 | 5/1991 |
| JP | 8-138037 | 5/1996 |
| JP | 9-037041 | 2/1997 |
| JP | 9-046472 | 2/1997 |
| JP | 09-284438 | 10/1997 |
| JP | 2000-036890 | 2/2000 |
| JP | 2000-188668 | 7/2000 |

* cited by examiner

*Primary Examiner*—Kimberly A. Williams
(74) *Attorney, Agent, or Firm*—Fitzpatrick, Cella, Harper & Scinto

(57) ABSTRACT

A reader has a one-pass both-side reading function and comprises a selector which synthesizes in a dot sequential manner image signals from a CCD for reading a front face image and from a contact sensor for reading a rear face image, and transmits both-side image data in the same configuration as that of an I/F which transmits one-side image data. It transfers image information to a printer at high speed without being equipped with a high-capacity memory and without increasing the number of signal lines.

6 Claims, 6 Drawing Sheets

IMAGE READING APPARATUS

BACKGROUND OF THE INVENTION

1. Field of the Invention

The present invention relates to an image reading apparatus, and particularly to an image reading apparatus capable of reading a front side and a back side of a document sheet simultaneously or almost simultaneously.

2. Related Background Art

Heretofore, when a both-side document sheet is read, a document sheet reversing mechanism is provided inside an ADF, and a front side of the document sheet is first read on the side of an image reading apparatus, and then the document sheet is, after having been read, reversed by the document sheet reversing mechanism inside the ADF, and then a back side of the document sheet is read on the side of the image reading apparatus, thereby reading a both-side document sheet image in accordance with this operation.

However, in this configuration, the time for reversing the document sheet is a dead time for the image reading apparatus, so that reading performance is lowered. Further, the document sheet is often damaged because it is reversed.

In view of this problem, a one-pass both-side image reading apparatus has recently been proposed which is equipped with a reading system inside an ADF and reads a front side image and a back side image by one-time document sheet conveying operation. FIG. 6 is a view showing a schematic configuration of the one-pass both-side image reading apparatus. A reading operation of the one-pass both-side image reading apparatus will be described using FIG. 6.

A plurality of both-side document sheets disposed on a document sheet putting table 71 of an ADF 70 is conveyed one by one. In a conveying path, the document sheets are separately conveyed one by one by means of separating rollers 72 and 73, and the document sheets are conveyed along conveying guides 74 and 77 in accordance with the turning in a direction of an arrow of a conveying roller 75.

Before the document sheet is conveyed to a reading position, a reading unit 200 moves right under a shading corrector plate 211 and performs shading correction. After finishing the shading correction, the reading unit 200 moves right under a viewer window 212, and is in a read standby state until the document sheet is conveyed.

When the document sheet is conveyed, the front side image of the document sheet is read right under the conveying roller 75. More specifically, a line image of the document sheet image illuminated by a lamp 201 inside the image reading apparatus 200 is focused on a CCD 209 via a first mirror 205, a second mirror 206, a third mirror 207 and a lens 208, and the line image is read. The conveying roller 75 conveys the document sheets at a predetermined speed, and the document sheets are sequentially read in a sub-scanning direction, whereby the front side image of the document sheet is read.

When reading of the front side of the document sheet image progresses and an edge of the document sheet is conveyed right under an equal size reading box 250, an image of the document sheet back side is read by the equal size reading box 250. An optical system of the equal size reading box 250 is constituted of a Selfoc lens 251, an image sensor 252 and a lamp 253, and the line image of the document sheet back side image illuminated by the lamp 253 is focused on the image sensor 252 via the Selfoc lens 251. The line image focused on a contact sensor is an image of an equal size. Since the conveying roller 75 conveys the document sheets at a predetermined speed, reading of the document sheet in the sub-scanning direction is sequentially performed, and thus the back side image of the document sheet is read. The both-side document sheet having been read is sequentially discharged at a discharge tray 78.

Image data of the front side and back side thus read is sent to an unillustrated image processing circuit, and the images are reproduced by a host computer, a printer or the like connected to the image reading apparatus, and then image formation processing is applied so that the images are formed on a display or a printing paper.

As described above, in case the image is copied by the printer to which a reader for simultaneously reading the both-side document sheet is connected, since both-side images can not be printed simultaneously on a printer side even if the reader simultaneously reads the both-side images. Therefore, the reader can not send the image data of the back side until the front side has been printed if a image data bus width is the same as the bus width for one-side document sheet reading. Plus such a method has to be applied that the image data of the back side document sheet is stored in a buffer memory having about a one-side capacity, and after the data of the front side has been sent, the image data of the back side document sheet stored in the buffer memory is sent. For this reason, there is caused a big problem of increased costs for the buffer memory. To solve this problem, double system data buses may be provided for sending front side image data and for sending back side image data, but it is not realistic because a cable which connects the reader and the printer becomes extremely thick considering recent increasing bits of image data.

Furthermore, since the printer sequentially prints the back side image followed by the front side image, the reader has to be on standby for almost a printing time of one-side amount until the next document sheet reading starts after the first both-side document sheet has been read, and thus the reader has not been able to exert its performance of simultaneously reading the both sides.

SUMMARY OF THE INVENTION

An object of the present invention is to enable a both-side document sheet to be read without providing a great amount of memories and without damaging the reading performance of a reader with a small number of signal lines.

In order to achieve the above object, one embodiment of the present invention is constituted so as to comprise an image reading apparatus capable of reading a document sheet which has images recorded on both front and back sides thereof, having: a first line image sensor which reads a front side image of the document sheet; a second line image sensor which reads a back side image of the document sheet; a first image processing circuit which A/D converts a front side image signal output from the first line image sensor to output front side image data; a second image processing circuit which A/D converts a back side image signal output from the second line image sensor to output back side image data; and a selector to which the front side image data and the back side image data are input per pixel almost simultaneously at a predetermined data rate and which outputs the input front side image data and the input back side image data alternately per pixel at a data rate twice as much as the predetermined data rate.

In such a configuration, a both-side document sheet can be read without providing a great amount of expensive memories and without damaging the reading performance of a reader with a small number of signal lines.

Other objects and features of the present invention will be apparent from the following descriptions and the accompanying drawings, in which like reference characters designate the same or similar parts throughout the figures thereof.

DESCRIPTION OF THE PREFERRED EMBODIMENTS

Preferred embodiments of an image reading apparatus of the present invention will hereinafter be described in reference to the drawings.

Figure 1:
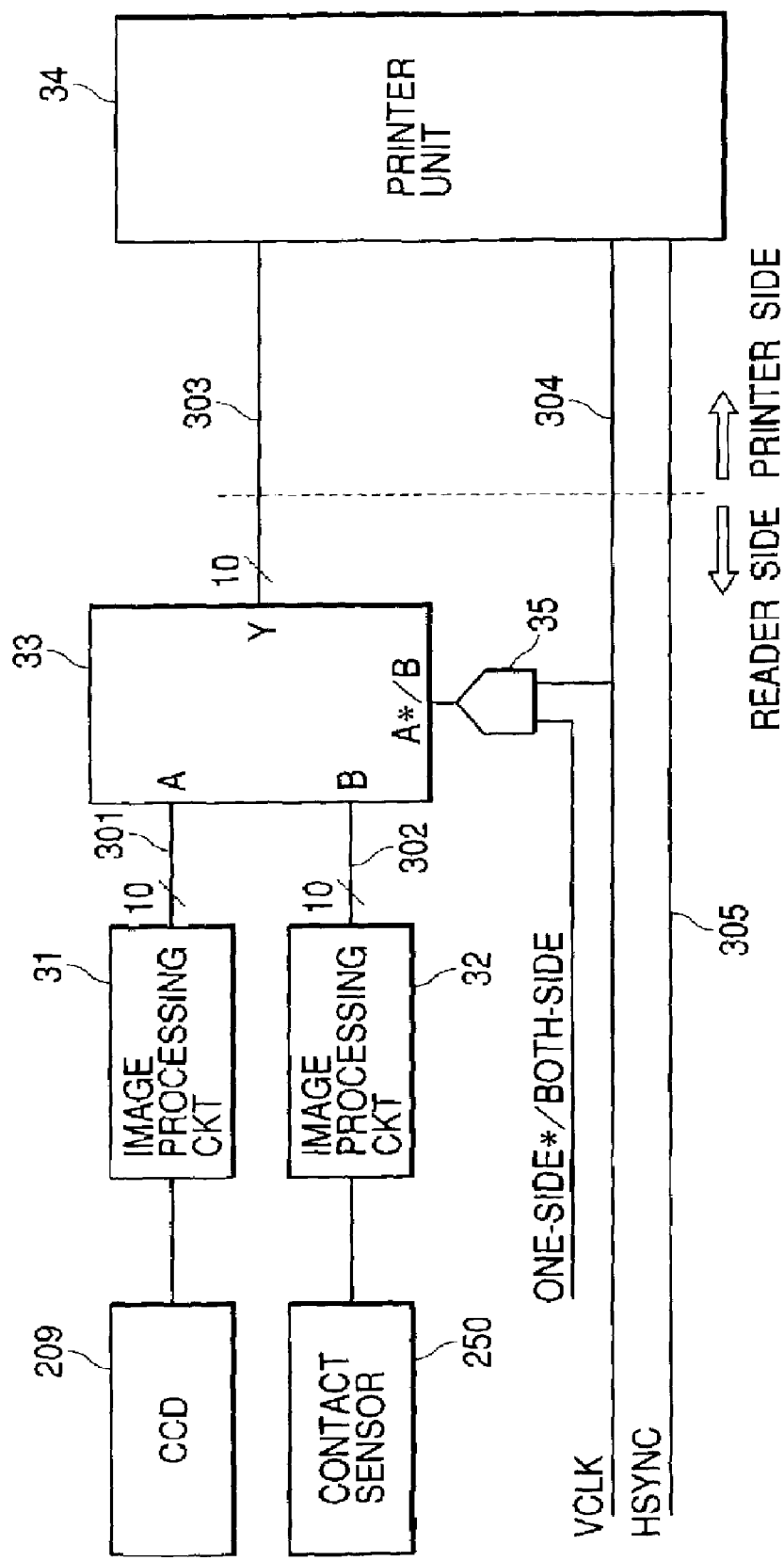
FIG. 1 is a schematic block diagram showing data flows from a CCD and a contact sensor.
Figure 6:
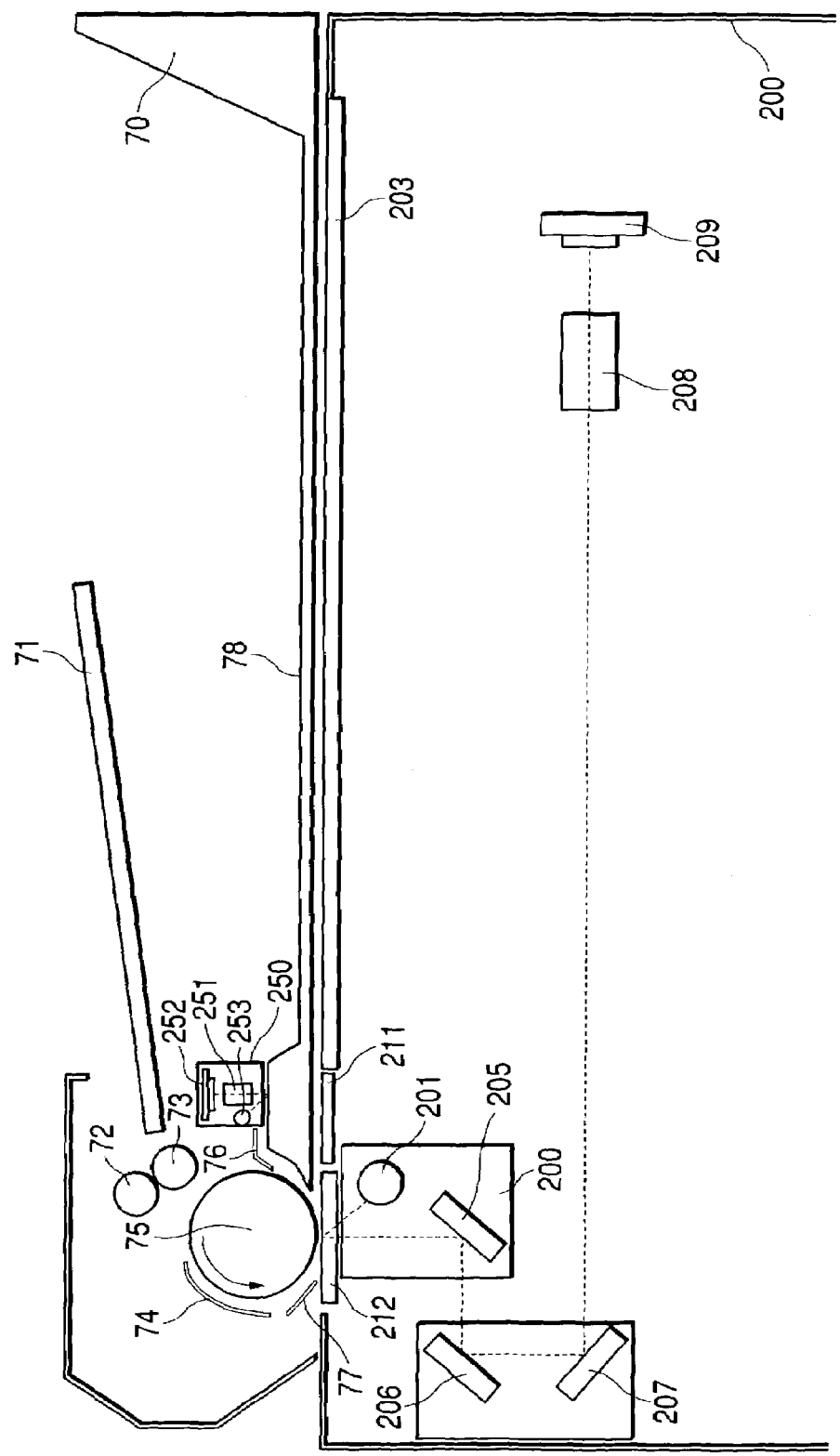
FIG. 6 is a view showing a configuration of an image reading apparatus equipped with an ADF.

FIG. 1 is a simple block diagram of an image copying apparatus in which the present invention is embodied. The same members as those in FIG. 6 are given the same numbers. A schematic operation of the block diagram shown in FIG. 1 will be described. When a front side of a both-side document sheet is read by a CCD 209, predetermined image processing including A/D conversion processing is applied to a front side image signal output from the CCD 209 in an image processing circuit 31, and a signal is input as 10-bit digital data 301 of the front side image for each pixel to a terminal A of a selector 33. On the other hand, when a back side image of the both-side document sheet is read by a contact sensor 250, the predetermined image processing including the A/D conversion processing is similarly applied to a back side image signal output from the contact sensor 250 in an image processing circuit 32, and a signal is input as 10-bit digital data 302 of the back side image for each pixel to a terminal B of the selector 33.

In the selector 33, a VCLK 304, which is a reference clock for driving the CCD 209 and the contact sensor 250, is input to a terminal A*/B via a gate 35. When a signal input to the terminal A*/B is 0, the signal input to the terminal A is output from a terminal Y, and when a signal of the terminal A*/B is 1, the signal input to the terminal B is output from the terminal Y.

To the other one of two inputs of the gate 35, a signal "one-side*/both-side" controlled by an unillustrated CPU is input. When the signal "one-side*/both-side" is 0, an input to the terminal A*/B is always 0 without depending on the logic of the VCLK 304, and the input signal of the terminal A is always output to an output 303 of the selector 33. On the other hand, in the case where the signal "one-side*/both-side" is 1, the input signal of the terminal A is selectively output to the output 303 of the selector 33 when the VCLK 304 is 0, and the input signal of the terminal B is selectively output to the output 303 of the selector 33 when the VCLK 304 is 1.

The reference clock VCLK 304 is also transmitted to a printer unit, and is used as a clock for taking in image signals. In addition, a signal HSYNC 305 is also transmitted to the printer, and is used as a synchronization signal of the image data.

Figure 2:
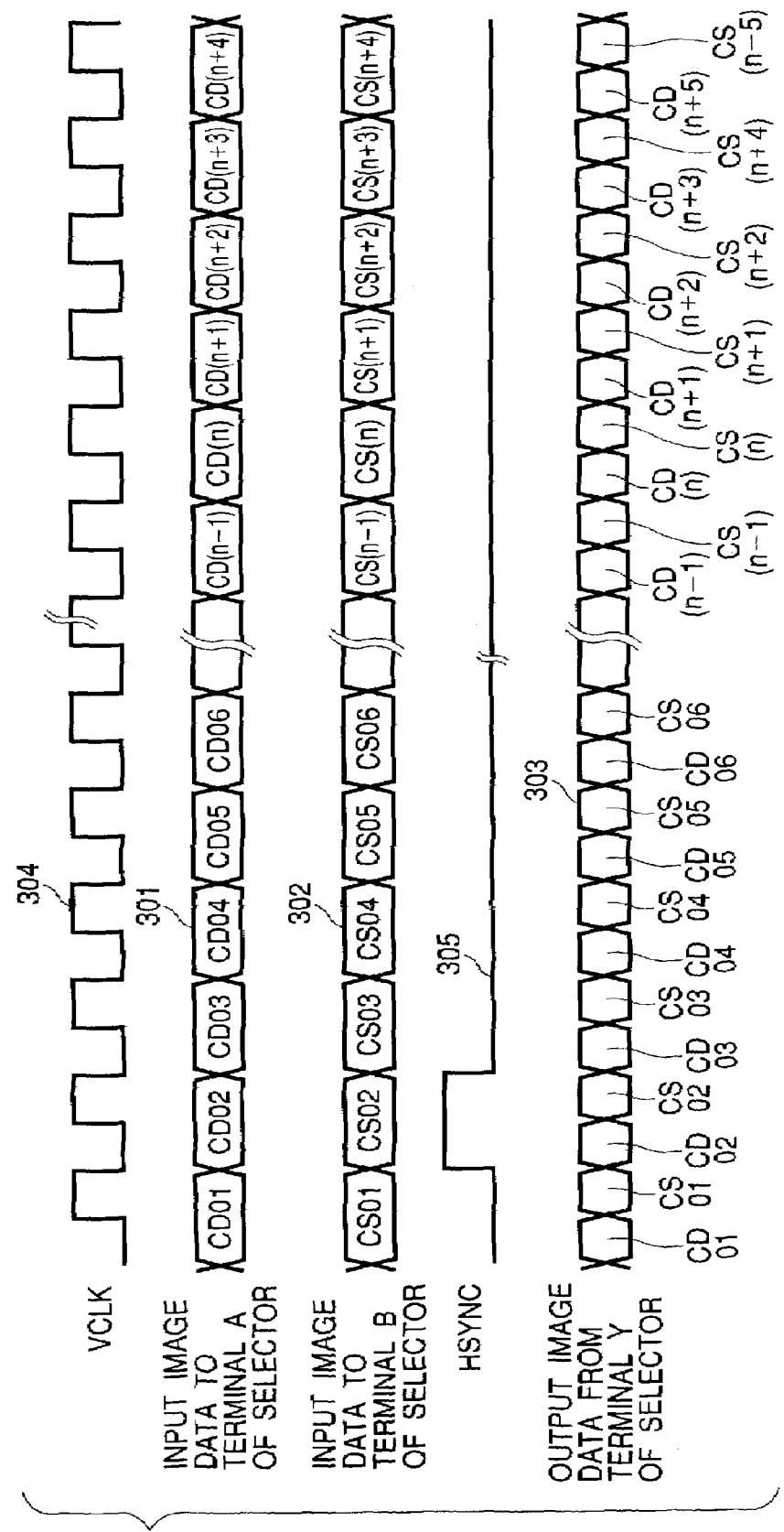
FIG. 2 is a timing chart when the present invention is embodied.

FIG. 2 shows a timing chart of each signal described above in FIG. 1. FIG. 2 is a timing chart when a both-side document sheet is read, and in FIG. 2, the signals are given the same numbers as those given to the signal lines illustrated in FIG. 1.

Here, since a both-side document sheet is read, the signal "one-side*/both-side" is fixed to 1. As apparent from FIG. 2, since a signal transmission data rate per clock is double the data rate output from the CCD 209 and the contact sensor 250 (i.e., input data rate of the selector 33), it is clear that image transfer corresponding to two sides can be accomplished in about the same time for one-side document sheet.

The HSYNC 305 is a main scanning synchronization signal, and is a signal for detecting an event of 0→1 and indicating what timing and later the data is valid. In an example of FIG. 2, it is assumed that a valid timing of the CCD 209 starts from a (0)th-pixel, and a valid timing of the contact sensor 250 starts from an (n)th-pixel.

As apparent from FIG. 1, a reading position of the CCD 209 and a reading position of the contact sensor 250 are set to be fixed at the end of assembling. Since in an adjustment process, the number of pixels corresponding to the distance between the reading position of the CCD 209 and the reading position of the contact sensor 250 are calculated, it is not necessary to prepare two systems of the main scanning synchronization signal HSYNC, and one system of HSYNC is sufficient as shown in FIG. 1 or FIG. 2. In other words, the number of signal lines connecting the reader and printer can be exactly the same as when a one-side document sheet is read.

Figure 3:
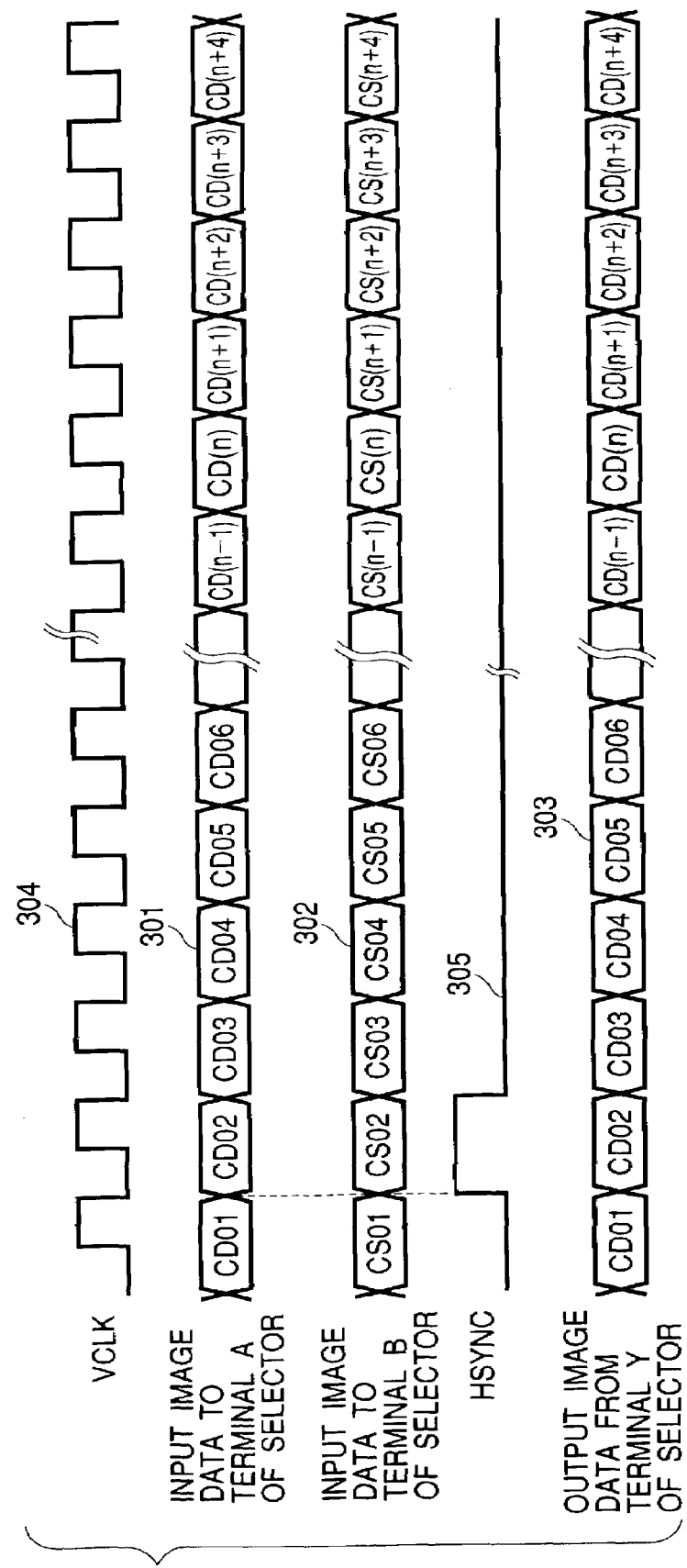
FIG. 3 is a timing chart when a one-side document sheet is read.

FIG. 3 shows a timing chart when a one-side document sheet is read using the above configuration, in the same way as FIG. 2. In FIG. 3, since a one-side document sheet is read, the signal "one-side*/both-side" is fixed to 0. As apparent from FIG. 2, since a signal transmission data rate per clock is the same as the data rate output from the CCD 209 and the contact sensor 250 (i.e., input data rate of the selector 33), it is clear that image transfer can be accomplished in about the same time as for reading the both-side document sheet. Naturally the image data of the contact sensor 250 is neglected because the one-side document sheet is read, so that the driving of the contact sensor 250 may be stopped when the one-side document sheet is read.

Figure 4:
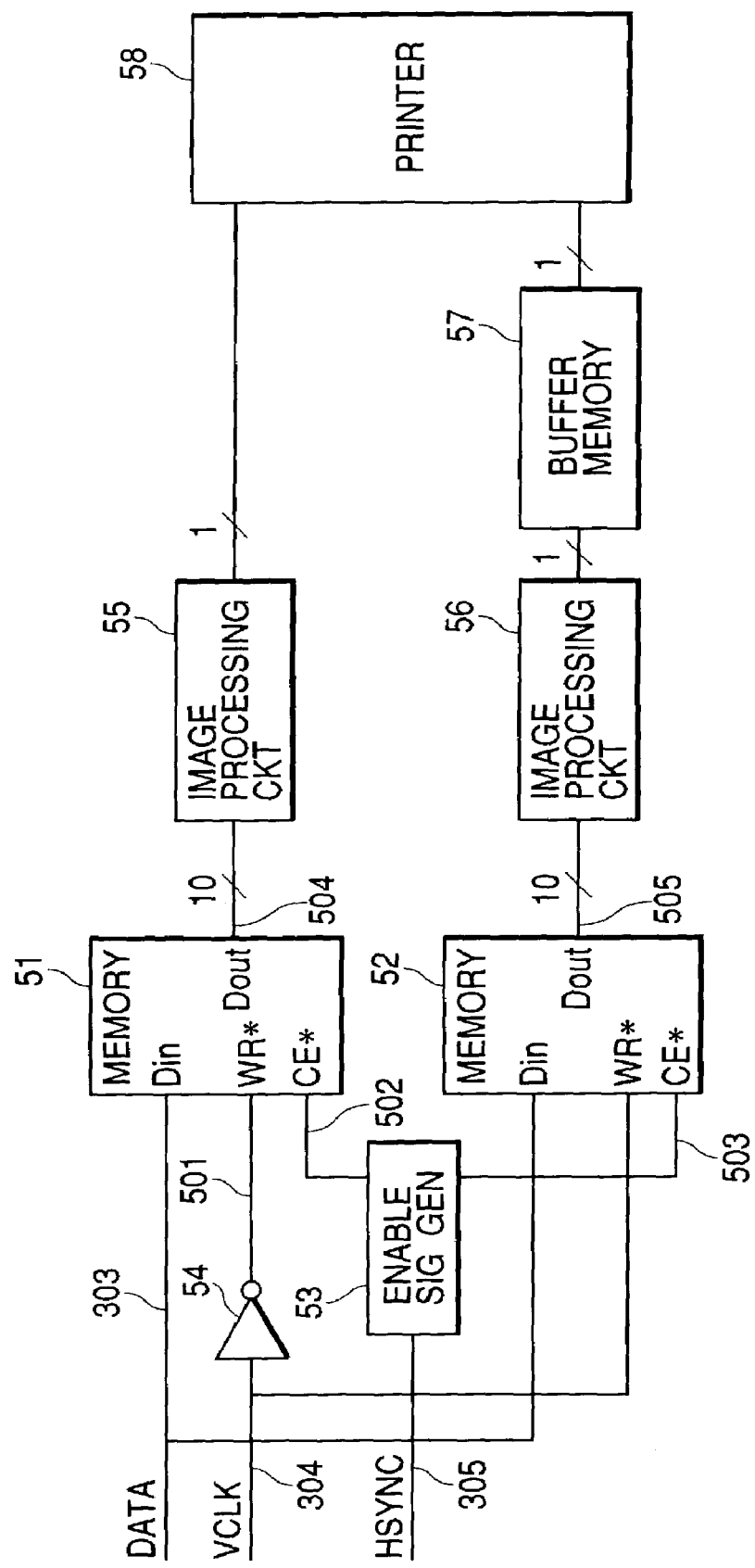
FIG. 4 is a schematic block diagram of a printer connected to a reader in which the present invention is embodied.

The image data from the reader transmitted in the above procedure is transmitted to a printer unit 34. FIG. 4 shows a schematic view of the printer unit 34.

In FIG. 4, a DATA 303, the VCLK 304 and the HSYNC 305 transmitted from the reader are input. The DATA 303 is input to a front side image memory 51 and a back side image memory 52. The VCLK 304 is input as a signal 501 to the front side image memory 51 via an inverter 54, and is also directly input to the back side image memory 52. The HSYNC 305 is input to an enable signal generating circuit 53, and generates a valid image data section signal, and is then input to the front side image memory 51 and the back side image memory 52.

Figure 5:
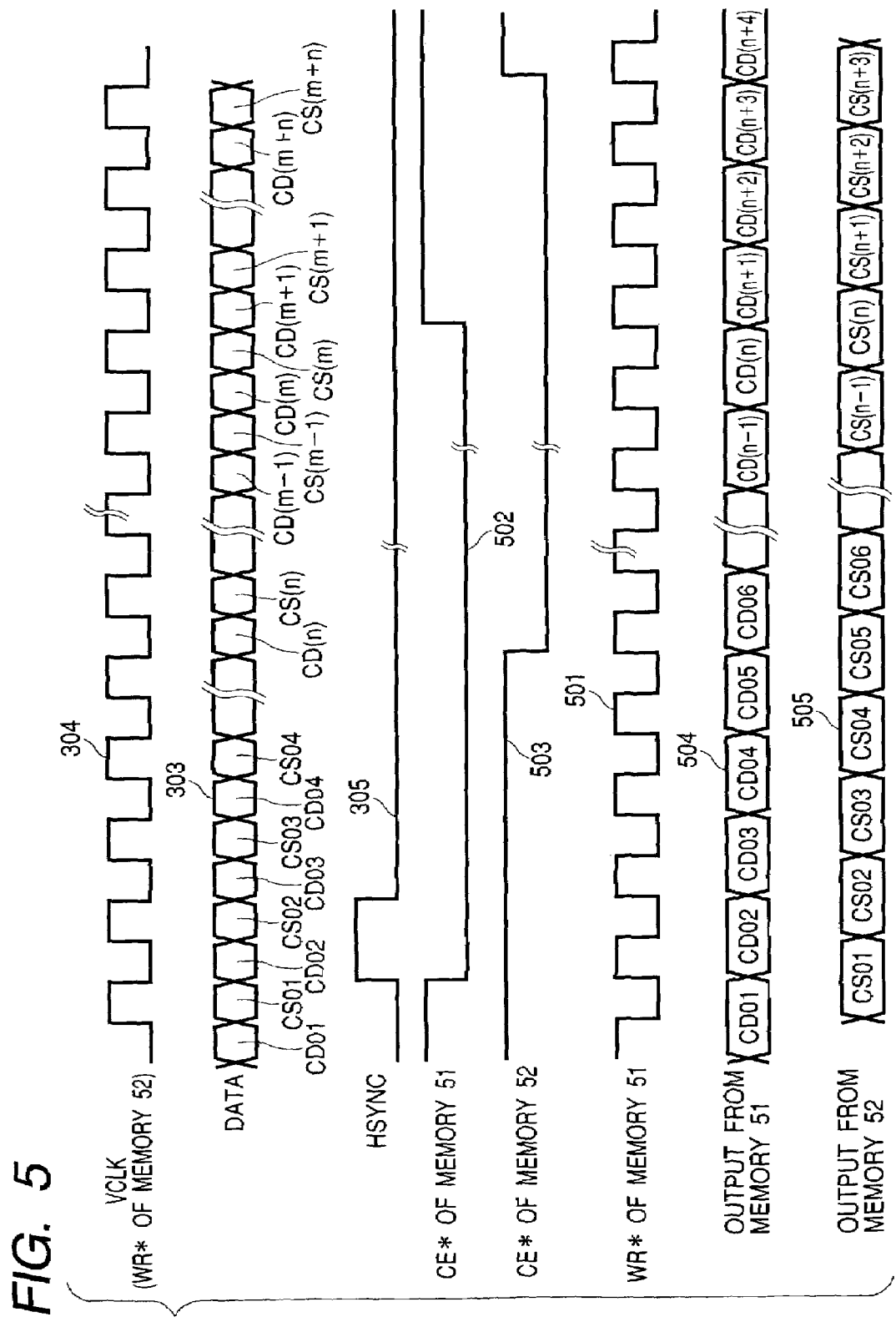
FIG. 5 is a timing chart of the main signals on a printer side.

FIG. 5 shows a timing chart representing the timing of the main signals in FIG. 4 when a both-side document sheet is read.

The image data DATA 303 transmitted from the reader is input to the memory 51 and the memory 52. The timing for writing into the memory 51 is decided by the rising edge of an input signal to a WR* terminal of the memory 51. The reverse signal 501 of the VCLK 304 by way of the inverter 54 is input to the WR* terminal of the memory 51, so that out of the DATA 303 in which the front side image data and the back side image data are formatted per pixel in a dot sequential manner, only front side data (CD**) is stored in the memory 51. On the other hand, the timing for writing into the memory 52 is decided by the rising edge of the VCLK 304 input to a WR* terminal of the memory 52. Out of the DATA 303 in which the front side image data and the back side image data are formatted per pixel in a dot sequential manner, only back side data (CS**) is stored in the memory 52.

Furthermore, the HSYNC 305 transmitted from the reader is input to the enable signal generating circuit 53, and generates memory enable signals 502 and 503 input to CE* terminals of the memory 51 and memory 52, respectively. In FIG. 5, CD02 to CD(m) of the CCD 209 are the valid image data, and stored in the memory 51. Further, CS(n) to CS(m+n) of the contact sensor 250 are the valid image data, and stored in the memory 52.

By adopting such a configuration, it is possible to separate the front side image data and the back side image data formatted in a dot sequential manner. Separated front side image data 504 is first digitalized into one-bit image data via an image processing circuit 55, and then transmitted to a printer 58 where the front side image is printed. On the other hand, back side image data 505 is once stored in a buffer memory 57 via an image processing circuit 56, and as soon as the printing of the front side image is finished, data transmission is started from the buffer memory 57, and then printing of the back side image is started.

By such a configuration described above, a both-side document sheet can be read without providing a great amount of expensive memories on the reader side and without damaging the reading performance of the reader with a small number of signal lines, so that the both-side document sheet can be read at low cost and at high speed.

What is claimed is:

1. An image reading apparatus capable of reading a document sheet which has images recorded on both front and back sides thereof, comprising:
   a first line image sensor which is driven by a reference clock and reads a front side image of the document sheet;
   a second line image sensor which is driven by the reference clock and reads a back side image of the document sheet;
   a first image processing circuit which A/D converts a front side image signal output from said first line image sensor to output front side image data;
   a second image processing circuit which A/D converts a back side image signal output from said second line image sensor to output back side image data; and
   a selector which alternately selects one of the front side image data and the back side image data in accordance with the reference clock and outputs the front side image data and the back side image data alternately per pixel.

2. The image reading apparatus according to claim 1, further comprising a document sheet conveying mechanism which conveys document sheets.

3. The image reading apparatus according to claim 2, wherein said second line image sensor is built in said document sheet conveying mechanism.

4. The image reading apparatus according to claim 2, wherein said first line image sensor and said second line image sensor are set apart in a direction of conveying document sheets so that said second line image sensor starts reading the back side image after said first line image sensor starts reading the front side image.

5. The image reading apparatus according to claim 1, wherein said selector alternately selects one of the front side image data and the back side image data in a case in which a two-sided document sheet is read, and selects the front side image data in a case in which a one-sided document sheet is read.

6. The image reading apparatus according to claim 1, further comprising:
   a first memory which is driven by the reference clock supplied via an inverter and stores the front side image data; and
   a second memory which is driven by the reference clock and stores the back side image data.

* * * * *